(12) United States Patent
Rabinovich et al.

(10) Patent No.: US 8,775,084 B2
(45) Date of Patent: Jul. 8, 2014

(54) ADAPTIVE BOREHOLE CORRECTIONS ACCOUNTING FOR ECCENTRICITY FOR ARRAY LATEROLOGS

(75) Inventors: Michael Boris Rabinovich, Houston, TX (US); Bill H. Corley, Conroe, TX (US)

(73) Assignee: Baker Hughes Incorporated, Houston, TX (US)

( * ) Notice: Subject to any disclaimer, the term of this patent is extended or adjusted under 35 U.S.C. 154(b) by 880 days.

(21) Appl. No.: 12/234,106

(22) Filed: Sep. 19, 2008

(65) Prior Publication Data

US 2009/0082969 A1 Mar. 26, 2009

Related U.S. Application Data

(60) Provisional application No. 60/994,803, filed on Sep. 20, 2007.

(51) Int. Cl.
*G01V 3/38* (2006.01)
(52) U.S. Cl.
USPC .............................. 702/7; 324/355; 324/356
(58) Field of Classification Search
USPC ...................................... 702/7; 324/355–356
See application file for complete search history.

(56) References Cited

U.S. PATENT DOCUMENTS

| | | | |
|---|---|---|---|
| 3,798,534 A * | 3/1974 | Schuster ...................... | 324/373 |
| 5,041,975 A | 8/1991 | Minerbo et al. | |
| 5,268,641 A | 12/1993 | Trouiller et al. | |
| 5,426,368 A * | 6/1995 | Benimeli et al. .............. | 324/366 |
| 5,867,806 A * | 2/1999 | Strickland et al. ................ | 702/7 |
| 5,900,733 A * | 5/1999 | Wu et al. ......................... | 324/338 |
| 6,216,089 B1 * | 4/2001 | Minerbo .......................... | 702/7 |
| 6,219,619 B1 * | 4/2001 | Xiao et al. ....................... | 702/7 |
| 7,122,152 B2 | 10/2006 | Lewis et al. | |
| 7,269,514 B2 | 9/2007 | Xiao | |
| 2002/0040274 A1 * | 4/2002 | Yin et al. ......................... | 702/7 |
| 2002/0112855 A1 * | 8/2002 | Arndt et al. ............... | 166/250.15 |
| 2004/0140801 A1 * | 7/2004 | Schoen et al. ................. | 324/303 |
| 2004/0149434 A1 * | 8/2004 | Frey et al. .................. | 166/250.1 |
| 2005/0030059 A1 * | 2/2005 | Tabarovsky et al. .......... | 324/800 |
| 2005/0256644 A1 * | 11/2005 | Xiao .................................. | 702/7 |
| 2006/0108112 A1 * | 5/2006 | Simon ........................ | 166/254.2 |
| 2006/0173624 A1 * | 8/2006 | Frenkel ............................ | 702/7 |
| 2007/0170071 A1 | 7/2007 | Suh et al. | |

OTHER PUBLICATIONS

Frenkel M. A., A Model-Based Method to Supply Missing Log Information, 2003, Baker Hughes, pp. 1-7.*

(Continued)

(Continued)

*Primary Examiner* — Janet Suglo
*Assistant Examiner* — Michael Dalbo
(74) *Attorney, Agent, or Firm* — G. Michael Roebuck

(57) ABSTRACT

Disclosed is an adaptive borehole correction (ABC) technique based on an inversion approach that advantageously corrects shallow laterolog measurements for borehole effects, including determining and accounting for unknown tool eccentricity. The algorithm is based on simplex radial 1-D inversion where at every logging up to four unknowns are determined, namely tool eccentricity, Rt, Rxo, and Lxo. After that a borehole correction methodology is employed wherein the tool response in a borehole with real mud resistivity Rm is modified to a response in the borehole with virtual mud resistivity equal to Rxo.

20 Claims, 6 Drawing Sheets

(56) References Cited

OTHER PUBLICATIONS

Notification of transmittal of the International Search Report and Written Opinion of the International Searching Authority issued Nov. 28, 2008 based on International Application No. PCT/US08/77147 filed Sep. 21, 2008; 9 pages.

A. Peyret and C. Torres-Verdín, Assessment of Shoulder-Bed, Invasion, and Lamination Effects on Borehole Sonic Logs: A Numerical Sensitivity Study, Jun. 4-7, 2006, University of Texas at Austin,. SPWLA 47th Annual Logging Symposium.

International Preliminary Report on Patentability issued Jun. 2, 2010 based on International Application No. PCT/US08/77147 filed Sep. 21, 2008; 7 pages. Form PCT/IPEA/409.

* cited by examiner

ADAPTIVE BOREHOLE CORRECTIONS ACCOUNTING FOR ECCENTRICITY FOR ARRAY LATEROLOGS

FIELD OF THE INVENTION

The present invention relates generally to hydrocarbon exploration and production, and more particularly relates to a method and system for characterizing subsurface formations of hydrocarbons.

BACKGROUND OF THE INVENTION

In the field of hydrocarbon exploration and production, accurately interpreting array resistivity log data is critical to drilling, formation evaluation, and reservoir characterization. Those of ordinary skill in the art will be familiar with a method for resistivity measurement known as laterolog. Laterolog is a measurement method wherein electric current is forced to flow radially through a downhole formation in a sheet of predetermined thickness, and us commonly used to measure resistivity in hard-rock reservoirs as a method of determining subterranean structural features.

State-of-the-art laterolog devices includes relatively shallow sub-arrays in addition to deeper sub-arrays that are similar to conventional deep and shallow DLL arrays. For example, the "MULL array laterolog tool" produced by Baker Atlas, Houston, Tex., consists of four sub-arrays (multi-level receivers or MLRs) with the following depths of investigation: MLR1—9 inches, MLR2—14 inches, MLR3—18 inches, and MLR4—35-40 inches.

Due to the shallow depth of investigation the measurements of shallow sub-arrays, especially MLR1 in the presently described example, are affected by borehole effects, including, as would be familiar to those of ordinary skill in the art, such factors as the density and effective thickness of intervening materials such as drilling fluid, mud cake, casing, cement, and rock matrix between the resistivity sensor arrays and the formation under investigation. Such borehole effects are especially pronounced in very conductive muds and in very large boreholes.

Borehole effects can be severe, such that conventional borehole corrections based just on borehole size, mud conductivity, and fixed value of tool eccentricity (typically used for dual laterolog (DLL) measurements) become ineffective. In addition, the MLR1 measurement, being relatively shallow, becomes very sensitive to radial position of the tool in hole, i.e., tool eccentricity. Often the tool eccentricity arbitrarily changes while logging, especially in the presence of borehole washouts, so the use of fixed eccentricity values does not provide adequate borehole correction.

SUMMARY OF THE INVENTION

In view of the foregoing, the present invention relates to an adaptive borehole correction (ABC) technique based on inversion approach that properly corrects shallow laterolog measurements for borehole effects including determining and accounting for unknown tool eccentricity. In one embodiment, the inversion algorithm is based on simplex (Nelder-Mead) radial one-dimensional (1-D) inversion where at every logging depth up to four unknowns can be determined, namely, tool eccentricity, formation resistivity (Rt), invasion resistivity (Rxo), and depth of invasion (Lxo). Subsequently a borehole correction is applied involving modification of the tool response in a borehole with real mud resistivity Rm to a response in the borehole with virtual mud resistivity equal to Rxo.

BRIEF DESCRIPTION OF THE DRAWINGS

The foregoing and other features and aspects of the present invention will be best appreciated by reference to a detailed description of the specific embodiments of the invention, when read in conjunction with the accompanying drawings, wherein.

DETAILED DESCRIPTION OF A SPECIFIC EMBODIMENT OF THE INVENTION

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts might be complex and time-consuming, outside the knowledge base of typical laymen, but would nevertheless be a routine undertaking for those of ordinary skill in the relevant fields.

All array laterolog measurements are focused measurements, meaning that shoulder bed effects are mostly accounted for. (Shoulder bed effects are well known to persons of ordinary skill in the art. See, e.g., Peyret et al., "Assessment of Shoulder-Bed, Invasion, and Lamination Effects on Borehole Sonic Logs: A Numerical Sensitivity Study," *SPWLA 47$^{th}$ Annual Logging Symposium*, Jun. 4-7, 2006, pp. 1-14.) Therefore, it is a reasonable assumption—at least for the purpose of borehole correction—to consider that at every logging depth the tool response is a function of a radial 1-D model. A simplified radial 1-D model that can be used in the practice of the present invention typically includes the following parameters: Rm—mud resistivity (Rm), borehole diameter (BHD), tool eccentricity (Ecc), formation resistivity (Rt), invasion resistivity (Rxo). and depth of invasion (Lxo).

If it is assumed that the first two parameters are known from temperature/tension/mud resistivity (TTRM) and caliper measurements, this leaves four unknowns that, in principle, can be determined by means of four independent measurements (MLR1, MLR2, MLR3, and MLR4).

Figure 1:
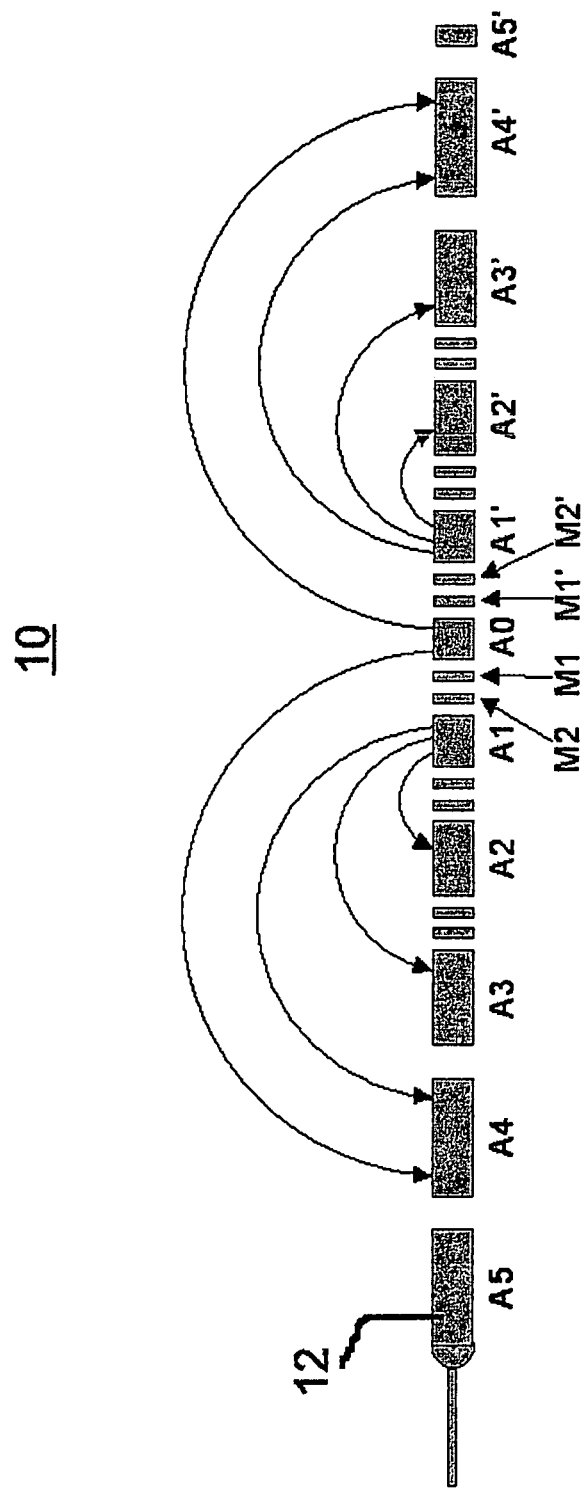
FIG. 1 is a schematic diagram of a multi-laterolog measurement device in accordance with one embodiment of the invention in a first measurement mode.

Referring to FIG. 1, there is shown schematically a multi-laterolog (MULL) measurement tool or mandrel 10 in accordance with one embodiment of the invention. As shown in FIG. 1, mandrel 10 comprises a series of electrodes in the form of conductive rings disposed along an elongate insulating mandrel body 12. A central electrode is designated A0 in FIG. 1 and is flanked on each side by pairs of monitor electrodes M1/M1' and M2/M2'.

Outside of electrode pairs M1/M1' and M2/M2' is a second electrode pair A2/A2', followed by another pair of monitor electrodes. Next follow third, fourth, and fifth electrode pairs A3/A3', A4/A4', and A5/A5'.

In a presently preferred embodiment, the distance between electrode subarray A4/A4' is twelve feet. Monitor electrode pairs M1/M1' and M2/M2' are each one inch in height (length) with three inches of spacing between electrodes M1 and M2 (and M1' and M2') and two inches of spacing between electrodes M1/M1' and electrode A0, as well as between electrodes M2 and A1 (and M2' and A1').

Furthermore, in the presently disclosed embodiment, there is an eight-inch gap between electrodes A1 and A2 (and A1' and A2'), between electrodes A2 and A3 (and A2' and A3'), and between electrodes A3 and A4 (and A3' and A4'). In each case, the eight inch spacing includes two one-inch monitor electrodes centrally spaced five inches apart.

FIG. 1 depicts tool 10 in which the first the first electrode subarray (A1/A1', also referred to as MLR1) is active. In this mode, corresponding to the shallowest depth of investigation, current is launched from center electrode A0 and from electrodes A1/A1', with the resultant current or voltage being sensed at the electrode subarrays A3/A3' and A4/A4'.

Figure 2:
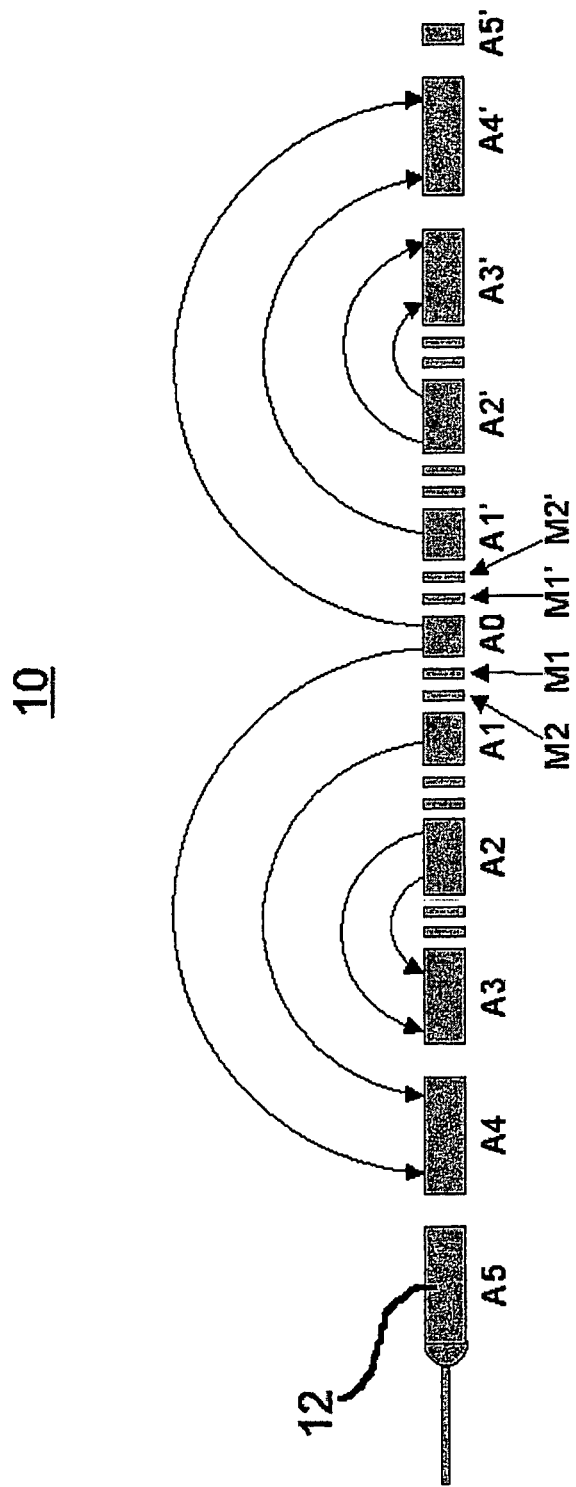
FIGS. 2, 3, and 4 are schematic diagrams of the measurement device from FIG. 1 shown in different respective sensing modes.

FIG. 2, on the other hand, depicts tool 10 in MLR2 mode, corresponding to a higher depth of investigation (14 inches) in which current is emitted from electrodes A0, A1/A1', and A2/A2' to be sensed at electrode subarrays A3/A3' and A4/A4'.

Figure 3:
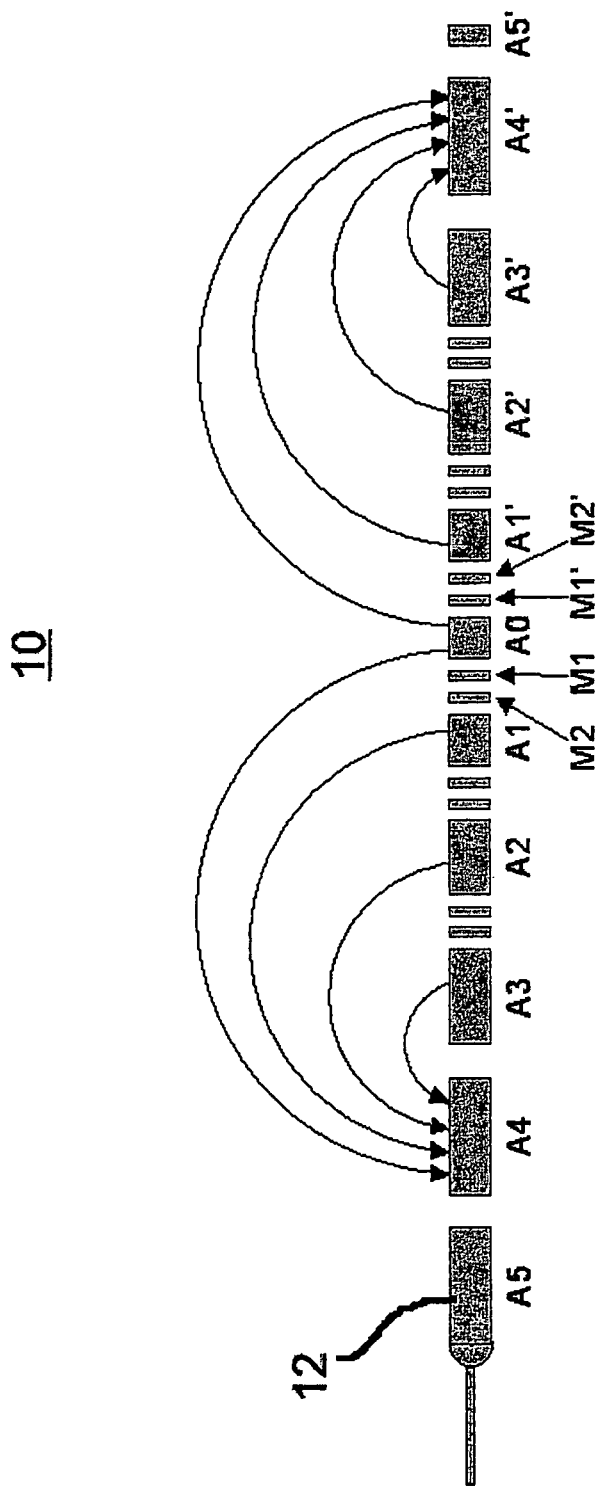

FIG. 3 depicts tool 10 in MLR3 mode, corresponding to an even greater depth of investigation (18 inches) where current is emitted from electrode subarrays A0, A1/A1', A2/A2' and A3/A3' to be sensed at electrode subarray A4/A4'.

Figure 4:
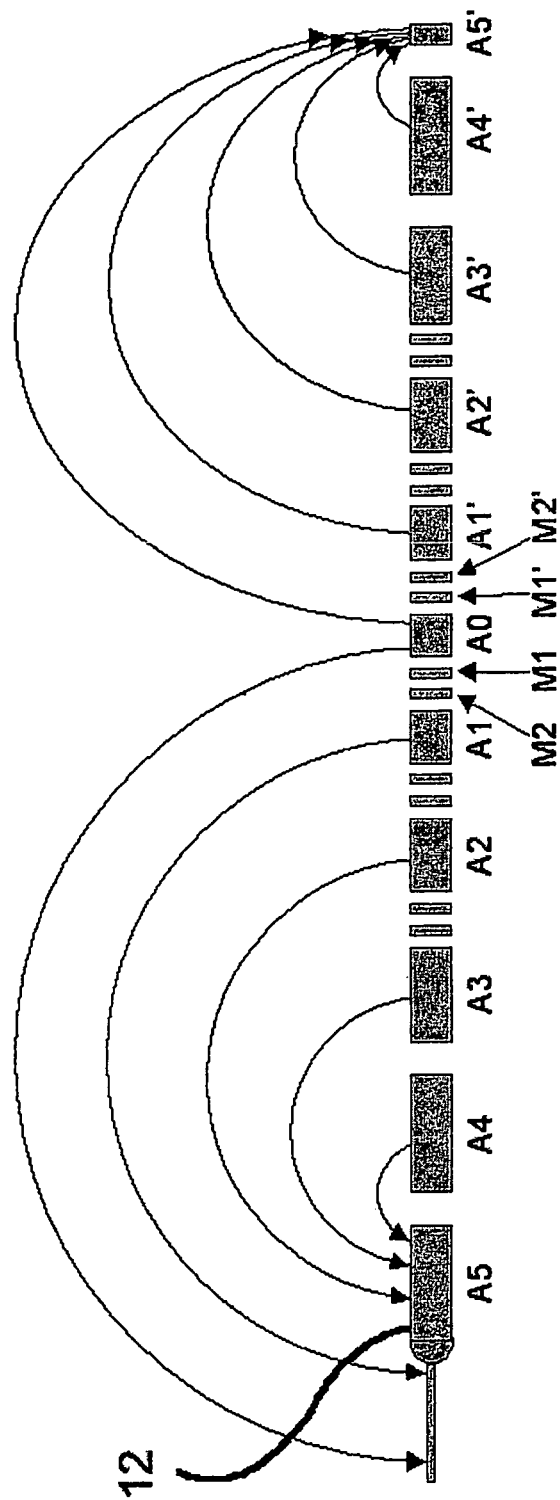
Figure 5:
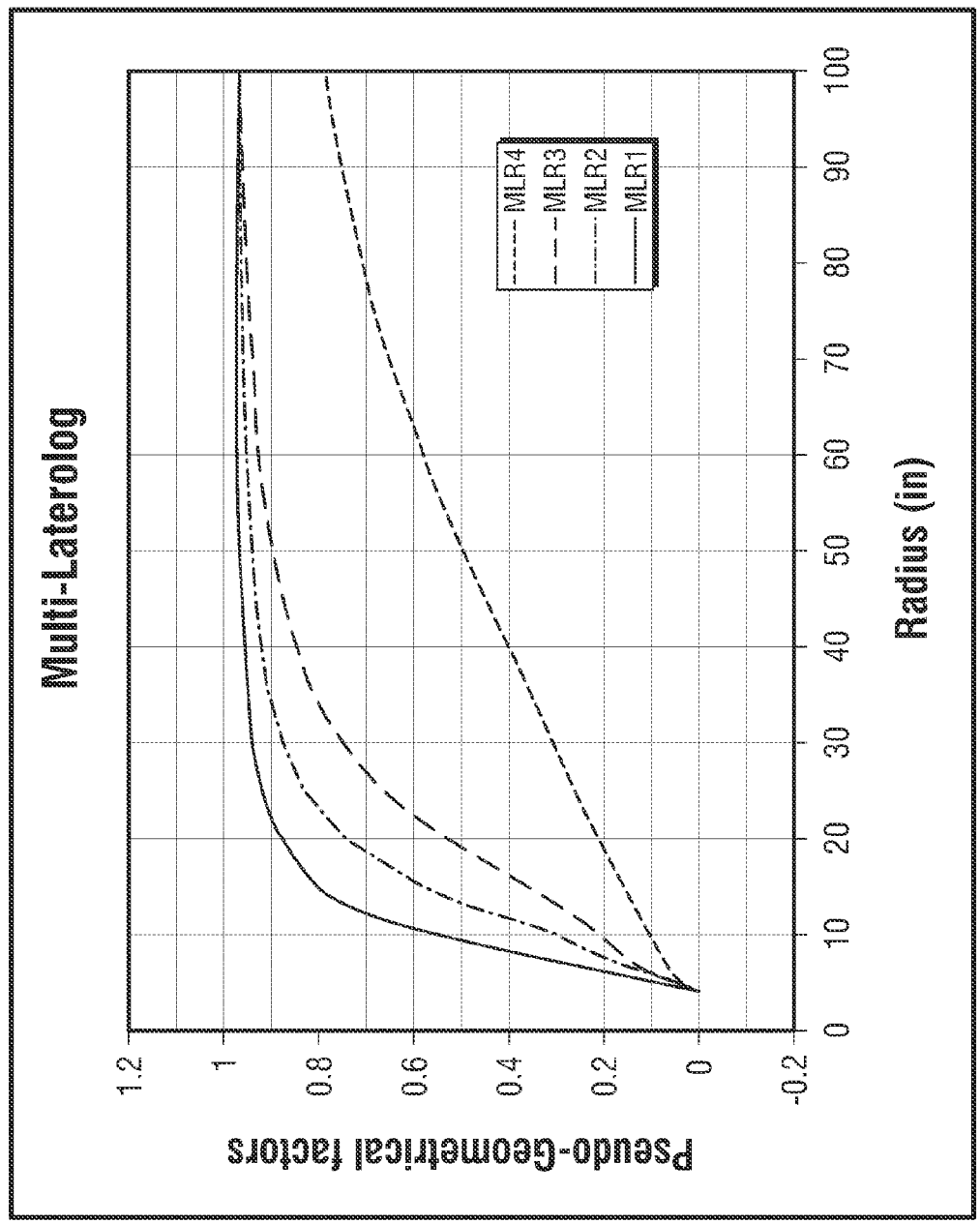
FIG. 5 is a plot of depth of investigation (radius, horizontal axis) versus pseudo-geometrical factor (ranging from zero to one) for four sensing modes MLR1, MLR2, MLR3 and MLR4 as considered by the methodology of the present invention.
Figure 6:
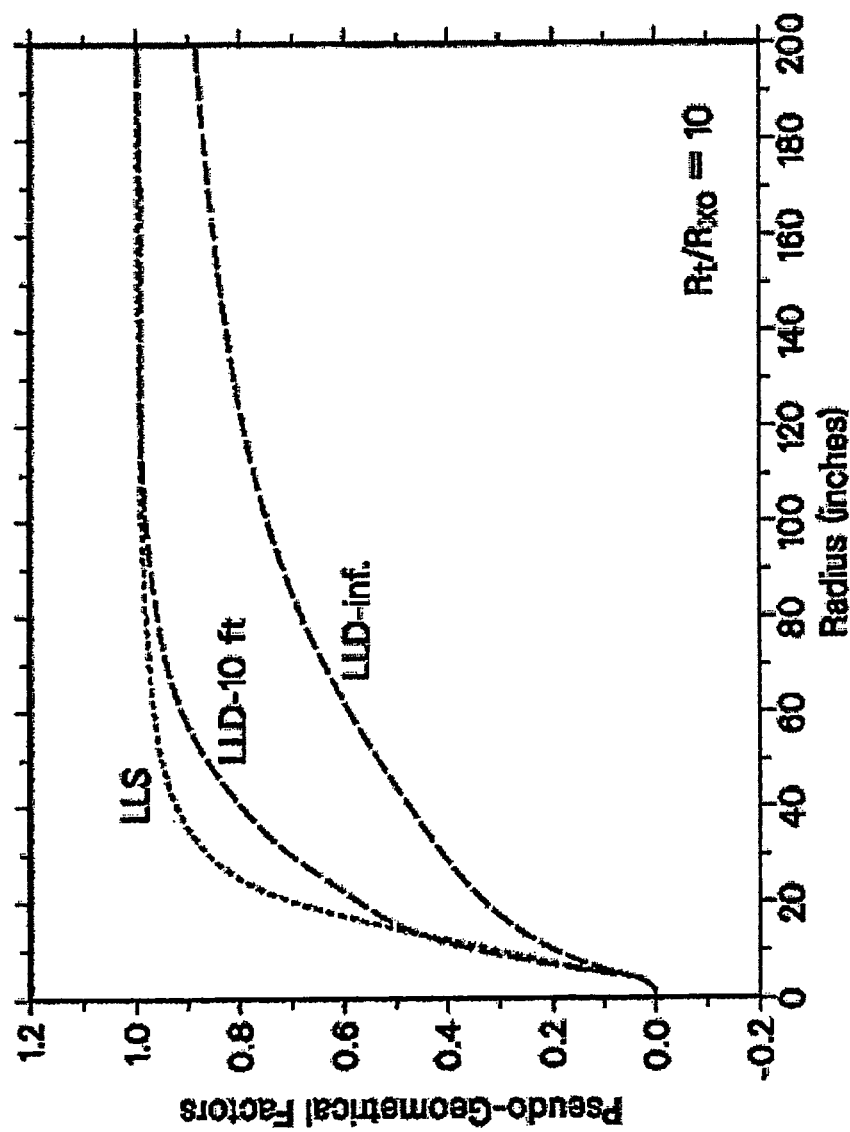
FIG. 6 is a plot of depth of investigation (radius, horizontal axis) versus pseudo-geometrical factor (ranging from zero to one) for tool depths ranging from the surface to theoretical bottom as considered by the methodology of the present invention.

Finally, FIG. 4 depicts tool 10 in MLR4 mode, corresponding to the greatest depth of investigation (on the order of 35 to 40 inches). In this mode, all electrode subarrays A0, A1/A1' . . . A4/A4' emit current that is sensed at electrode subarray A5/A5'.

Those of ordinary skill will note that the fewer unknowns in any inversion (such as the adaptive borehole correction (ABC) inversion methodology described herein), the faster it converges, leaving less ambiguity in the results. If the formation is not invaded, only two parameters need to be determined: Ecc and Rt. As would be appreciated by those of ordinary skill, the determination as to whether or not the formation is invaded can be made based on different thresholds, for example the ratio of MLR4 to MLR2 or a value of gamma ray. Another option is to invert assuming no invasion has occurred, and if the resulting misfit is not acceptable, then to rerun the inversion with "invaded" model.

Often, the micro-laterolog (MLL) curve is acquired together with multi-laterolog (MULL) measurement, so that it (MLL) can be incorporated into the adaptive borehole correction methodology. If MLL is reliable (which is not always the case due to the possible problems with a pad contact) it may be used as Rxo in "invaded" models, so that the number of unknowns in the ABC inversion is reduced to three.

Another option is to use MLL to constrain Rxo in inversion. Inversion based on four unknowns is still performed, but the difference between Rxo and MLL is included in the penalty function. This solution is believed to have more tolerance to inaccuracy in MLL values.

After all unknowns are determined, and in accordance with one embodiment of the invention, the following equation is applied to correct for borehole effects:

$$MLRx_{cor} = MLRx_{meas} \cdot \frac{MLRx(Rm = Rxo, BHD, Ecc, Rxo, Lxo, Rt)}{MLRx(Rm, BHD, Ecc, Rxo, Lxo, Rt)}$$

where $MLRx_{cor}$ is the corrected measurement for sub-array x (x=1, 2, 3, or 4);

$MLRx_{meas}$ is the field measurement for sub-array x;

MLRx(Rm,BHD,Ecc,Rxo,Lxo,Rt) is the calculated response for sub-array x for specified parameters where Rm is measured by TTRM mud resistivity; and MLRx(Rm=Rxo,BHD,Ecc,Rxo,Lxo,Rt) is the calculated response for sub-array x for specified parameters where Rxo value is used for mud resistivity;

A simplex optimization method (e.g., the Nelder-Mead algorithm) is used in the one dimensional (1-D) radial inversion. As would be appreciated by those of ordinary skill, this optimization method does not require Jacobean calculations and usually converges quickly to a global minimum. To avoid local minima and speed up convergence a good initial guess is required. To this end, all four MLRx measurements are preferably used to build a good initial guess, usually extrapolating MLR3 and MLR4 to obtain Rt and MLR2 and MLR1 to obtain Rxo. An obtained model from the previous depth might also be used as initial guess at the current depth if the data appears not to change substantially from depth to depth.

Another mechanism to avoid local minima is to start simplex optimization several times from different places—in this case the algorithm builds different simplexes and has a better chance to converge to the global minimum.

One of the most important issues for any inversion processing is a fast forward modeling. In the prior art, one 1-D radial forward modeling code that accounts for eccentricity (namely, XLOG) calculates MULL responses for one set of parameters from 15 seconds to 1 minute depending on a particular processor and a compiler. In accordance with one aspect of the invention, the ABC inversion described herein requires from several dozen to several hundred different Earth models per one logging depth, depending on the data complexity and the accuracy of the initial guess. This makes the direct use of XLOG in the ABC methodology described herein unrealistic.

Consequently, and in accordance with one aspect of the invention, a look-up-table-based forward modeling methodology is employed, which allows for calculation of one forward model in less that quarter of a second on a typical personal computer platform. The look-up table (LUT) is pre-calculated using the XLOG code on the grid covering all possible ranges of Earth model parameters.

In the most general case there six Earth model parameters: Rm, BHD, Ecc, Rxo, Lxo, Rt. For an ideal galvanic tool all model resistivities are normalized by Rm and by so doing. the size and dimension of LUT is reduced. In practical implementation, due the finite impedance of voltage sources, there is some dependence of mud resistivity on normalized tool responses. The effect can reach 10-15% for deep sub-arrays in low resistivity formations. To account for Rm dependence a 5-dimensional LUT is pre-calculated for four different mud resistivities 0.01, 0.1, 1, and 10 Ohm-m. When the tool response for a particular Rm is calculated, two LUTs with the closest Rm values are used and a linear interpolation of either extracted sub-arrays responses or spline coefficients is performed between the two.

After reducing the dimension of LUT to five, the look-up tables are quite large. Therefore, for each sub-array four LUTs (for four different values of Rm) are pre-calculated using XLOG, resulting in LUTS with a typical size of about 100000 values each. To accurately and promptly calculate tool responses for arbitrary formation parameters using a five-dimensional LUT a multiplicative 1-dimensional spline interpolation technique is employed. In addition, to achieve fast performance of this algorithm the spline coefficients are stored in the LUT instead of actual tool responses.

In an un-invaded formation ABC correction is optimized by using forward modeling based on an LUT specifically designed for un-invaded cases. Reducing the dimension of LUT to three allows the tool response for one set of formation parameters to be calculated in a time on the order of one hundredth of a second.

From the foregoing disclosure, it should be apparent that a system and method for accounting for tool eccentricity in multiple array laterolog measurements has been disclosed. Those of ordinary skill in the art will recognize that the methodology of the present invention may be advantageously practiced in conjunction with any one of a multitude of known multi-electrode tools, and the invention may be advantageously applied in conjunction with electrode configurations other than those of the exemplary embodiment disclosed herein.

Although a specific embodiment of the invention as well as possible variants and alternatives thereof have been described and/or suggested herein, it is to be understood that the present disclosure is intended to teach, suggest, and illustrate various features and aspects of the invention, but is not intended to be limiting with respect to the scope of the invention, as defined exclusively in and by the claims, which follow.

Indeed, it is contemplated and to be explicitly understood that various substitutions, alterations, and/or modifications, including but not limited to any such implementation variants and options as may have been specifically noted or suggested herein, including inclusion of technological enhancements to any particular method step or system component discovered or developed subsequent to the date of this disclosure, may be made to the disclosed embodiment of the invention without necessarily departing from the technical and legal scope of the invention.

What is claimed is:

1. A method for determination of properties near a borehole with measured galvanic data, the method comprising:

inputting measured galvanic data, $MLRx_{meas}$, wherein $MLRx_{meas}$ is a variable for measured galvanic data, from a plurality of log measurements from a logging tool in a borehole, calculating a corrected measured galvanic data measurement $MLRx_{cor}$ wherein $MLRx_{cor}$ is calculated by correcting the measured galvanic data, $MLRx_{meas}$ by multiplying the measured galvanic data $MLRx_{meas}$ by a correction ratio, $$MLRx_{cor} = MLRx_{meas} \cdot \frac{MLRx(Rm = Rxo, BHD, Ecc, Rxo, Lxo, Rt)}{MLRx(Rm, BHD, Ecc, Rxo, Lxo, Rt)}$$

wherein
$MLRx_{cor}$ is the corrected galvanic measurement for sub-array x (x=1, 2, 3, or 4);

$MLRx_{meas}$ is the field measurement for sub-array x; and
$MLRx(Rm,BHD,Ecc,Rxo,Lxo,Rt)$ is the calculated response for sub-array x for specified parameters where Rm is measured by $TTRM_{mud}$ resistivity; and
$MLRx(Rm=Rxo,BHD,Ecc,Rxo,Lxo,Rt)$ is the calculated response for sub-array x for specified parameters where Rxo value is used for the mud resistivity value;
wherein BHD is borehole diameter, Ecc is tool eccentricity, Rt is formation resistivity, Rxo is invasion resistivity, and Lxo is depth of invasion, wherein the correction ratio is calculated utilizing a first inversion wherein a mud resistivity is set equal to an invasion resistivity Rxo and a second inversion wherein the mud resistivity is set equal to a measured mud resistivity Rm; and determining, using inversion of the galvanic data and bore hole correction parameters, prior to bore hole correction of the galvanic data, at least one resistivity value and at least one tool eccentricity value from the plurality of log measurements, wherein said determining comprises determining multiple resistivity values, wherein said multiple resistivity values include formation resistivity and invasion resistivity.

2. A method as in claim 1 wherein said at least one resistivity value includes a known mud resistivity.

3. A method as in claim 1 wherein said determining comprises using a known borehole diameter.

4. A method as in claim 1 wherein said determining further comprises determining depth of invasion.

5. A method as in claim 1 wherein said determining comprises inverting, using a one dimensional radial inversion.

6. A method as in claim 5 wherein an initial guess in said inverting is provided through use of all sensed current.

7. A method as in claim 5 wherein said inverting comprises simplex optimization inverting.

8. A method as in claim 7 further comprising starting simplex optimization several times from different starting points.

9. A method as in claim 5 wherein said inverting further comprises fast forward modeling.

10. A method as in claim 9 wherein said fast forward modeling comprises using a look up table of tool response values for earth model parameters.

11. A method as in claim 10 wherein said earth model parameters comprise:
Rm BHD, Ecc, Rxo, Lxo, and Rt.

12. A method as in claim 10 wherein at least one model resistivity in said inverting are normalized by Rm.

13. A method as in claim 10 further comprising linear interpolation of extracted sub-array responses using at least two look up tables with closest Rm values.

14. A method as in claim 10 further comprising linear interpolation of spline coefficients between at least two look up tables with the closest Rm values.

15. A method as in claim 10 further comprising using a 5-dimensional look up table of at least four different mud resistivities.

16. A method as in claim 10 wherein said forward modeling comprises interpolating between at least two look up tables using a multiplicative 1-dimensional spline interpolation technique.

17. A method as in claim 16 further using spline coefficients stored in a look up table.

18. A method as in claim 1, further comprising making the log measurements to obtain measured galvanic data, according to a set of steps comprising:
emitting current from a central electrode located on a mandrel and from a first pair of electrodes located on the mandrel, wherein the central electrode is located between the first pair electrodes;

sensing at least some of the current emitted from at least one of the current-emitting electrodes at a second pair of electrodes located on the mandrel, wherein the first pair of electrodes is located between the second pair of electrodes; sensing at least some of the current emitted from at least one of the current-emitting electrodes at a third pair of electrodes located on the mandrel, wherein the second pair of electrodes is located between the third pair of electrodes;

emitting current from the central electrode, from the first pair of electrodes, and from the second pair of electrodes;

sensing at least some of the current emitted from at least one of the current-emitting electrodes at the third pair of electrodes;

sensing at least some of the current emitted from at least one of the current-emitting electrodes at a fourth pair of electrodes located on the mandrel, wherein the third pair of electrodes is located between the forth pair of electrodes;

emitting current from the central electrode, from the first pair of electrodes, from the second pair of electrodes, and from the third pair of electrodes, sensing at least some of the current emitted from at least one of the current-emitting electrodes at the forth pair of electrodes;

emitting current from the central electrode, from the first pair of electrodes, from the second pair of electrodes, form the third pair of electrodes, and from the forth pair of electrodes, sensing at least some of the current emitted from at least one of the current emitting electrodes at a fifth pair of electrodes located on the mandrel, wherein the forth pair of electrodes is located between the fifth pair of electrodes; and inputting measured galvanic data, $MLRx_{meas}$, wherein $MLRx_{meas}$ is a variable for measured galvanic data, from a plurality of log measurements from a logging tool in a borehole, calculating a corrected measured galvanic data measurement $MLRx_{cor}$ wherein $MLRx_{cor}$ is calculated by correcting the measured galvanic data, $MLRx_{meas}$ by multiplying the measured galvanic data $MLRx_{meas}$ by a correction ratio, $$MLRx_{cor} = MLRx_{meas} \cdot \frac{MLRx(Rm = Rxo, BHD, Ecc, Rxo, Lxo, Rt)}{MLRx(Rm, BHD, Ecc, Rxo, Lxo, Rt)}$$

wherein $MLRx_{cor}$ is the corrected galvanic measurement for sub-array x (x=1, 2, 3, or 4);

$MLRx_{meas}$ is the field measurement for sub-array x; and $MLRx(Rm,BHD,Ecc,Rxo,Lxo,Rt)$ is the calculated response for sub-array x for specified parameters where Rm is measured by $TTRM_{mud}$ resistivity; and $MLRx(Rm=Rxo,BHD,Ecc,Rxo,Lxo,Rt)$ is the calculated response for sub-array x for specified parameters where Rxo value is used for the mud resistivity value;

wherein BHD is borehole diameter, Ecc is tool eccentricity, Rt is formation resistivity, Rxo is invasion resistivity, and Lxo is depth of invasion, wherein the correction ratio is calculated utilizing a first inversion wherein a mud resistivity is set equal to an invasion resistivity Rxo and a second inversion wherein the mud resistivity is set equal to a measured mud resistivity Rm; and determining, using inversion of the galvanic data and bore hole correction parameters, prior to bore hole correction of the galvanic data, at least one resistivity value and at least one tool eccentricity value from the plurality of log measurements, wherein said determining comprises determining multiple resistivity values, wherein said multiple resistivity values include formation resistivity and invasion resistivity.

19. A method as in claim 18 wherein each of the sensing steps results in a field measurement and wherein the method further comprises applying a correction in a field measurement dependent on a calculated response for each field measurement, wherein the calculated response is dependent on a field measurement of at least one resistivity parameter and tool eccentricity.

20. The method of claim 1 wherein at least one log measurement from the plurality of log measurements is a laterolog measurement.

* * * * *